United States Patent
Yoda et al.

(10) Patent No.: US 8,846,236 B2
(45) Date of Patent: Sep. 30, 2014

(54) BATTERY HOLDING FRAME AND ASSEMBLED BATTERY

(75) Inventors: Takehito Yoda, Okazaki (JP); Kazuya Matsushita, Komaki (JP)

(73) Assignees: Toyota Jidosha Kabushiki Kaisha, Toyota-shi (JP); Kojima Press Industry Co., Ltd, Toyota-shi (JP)

( * ) Notice: Subject to any disclaimer, the term of this patent is extended or adjusted under 35 U.S.C. 154(b) by 193 days.

(21) Appl. No.: 12/498,082

(22) Filed: Jul. 6, 2009

(65) Prior Publication Data

US 2010/0003589 A1 Jan. 7, 2010

(30) Foreign Application Priority Data

Jul. 7, 2008 (JP) ................................ 2008-176505

(51) Int. Cl.
*H01M 2/18* (2006.01)
*H01M 2/10* (2006.01)
*H01M 2/20* (2006.01)

(52) U.S. Cl.
CPC .............. *H01M 2/1077* (2013.01); *Y02E 60/12* (2013.01); *H01M 2/206* (2013.01)
USPC ............................................ 429/130; 429/96

(58) Field of Classification Search
USPC ........................................................ 429/130
IPC ................................................ H01M 2/10,2/20
See application file for complete search history.

(56) References Cited

FOREIGN PATENT DOCUMENTS

| JP | 2006-066322 A | | 3/2006 |
| JP | 2006066322 A | * | 3/2006 |
| JP | 2006-260905 A | | 9/2006 |
| JP | 2006260905 A | * | 9/2006 |
| JP | 2007-115437 A | | 5/2007 |
| JP | 2007115437 A | * | 5/2007 |
| JP | 2007-328926 A | | 12/2007 |
| JP | 2007328926 A | * | 12/2007 |

OTHER PUBLICATIONS

Japanese Office Action for corresponding Japanese Patent Application No. 2008-176505 mailed Nov. 16, 2010.
Chinese Office Action for Chinese Patent Application No. 200910151724.5, dated Jun. 21, 2011.

* cited by examiner

*Primary Examiner* — Ula C Ruddock
*Assistant Examiner* — Daniel Gatewood
(74) *Attorney, Agent, or Firm* — Sughrue Mion, PLLC

(57) ABSTRACT

An insulative battery holding frame for holding a battery cell includes a fixing portion for fixing the frame to a base member, and an electrical connection preventing portion for preventing any electrical connection between the base member and the fixing portion, the connection being caused by flow of a fluid. The electrical connection preventing portion can include an entrance preventing portion for preventing the fluid having electrical conductivity from entering into the fixing portion, and a guiding portion for guiding the fluid into an insulation region arranged in a lower side portion of the secondary battery cell.

11 Claims, 4 Drawing Sheets

BATTERY HOLDING FRAME AND ASSEMBLED BATTERY

PRIORITY INFORMATION

This application claims priority to Japanese Patent Application No. 2008-176505, filed on Jul. 7, 2008, which is incorporated herein by reference in its entirety.

TECHNICAL FIELD

The present invention relates to a battery holding frame and an assembled battery, and more particularly to a battery holding frame for holding secondary batteries at predetermined positions, and an assembled battery composed of a plurality of secondary batteries held in the battery holding frame.

BACKGROUND ART

A secondary battery cell, such as a lithium ion secondary battery and a nickel hydrogen secondary battery, has a predetermined electromotive force and can be repeatedly used by being charged and discharged. A secondary battery module (assembled battery) holds the secondary battery cells with a battery holding frame made of an insulating member, such as a plastic resin, to assemble the secondary battery cells. Such a secondary battery module has been conventionally mounted on, e.g., a hybrid vehicle and has been used as means for performing charging by utilizing, e.g., regenerated energy. An electrolyte or a gel electrolyte, which is an electrolyte solidified into a gel, is generally sealed in a secondary battery cell. The electrolyte leaking out of such a battery, condensed water produced by a temperature change, and the like, sometimes flow into a metallic portion of a vehicle body or the like through a fixing portion, such as a bolt, of the battery holding frame. Some techniques for preventing any electrical connection caused by the inflows of the electrolyte, the condensed water, and the like, into the metallic portion have been disclosed.

JP 2007-328926 A describes a battery module equipped with a liquid receiving pan for housing and holding the electrolyte leaking out of a battery pack.

JP 2007-115437 A describes a battery module structure including a space portion for accumulating leakage of an electrolyte and condensed water into a part corresponding to the directly under part of a battery cell in a resin frame holding the battery cell.

However, if the distance from a battery holding portion of a battery holding frame to a fixing portion is short, then it is apprehended that, for example, condensed water on the wall surface of the battery holding portion or in the vicinity thereof, or a fluid having electrical conductivity, such as an electrolyte, which leaks from the inner part of a battery cell slightly, moves along the outer side of the battery cell or the wall surface and edge portion of the battery holding frame to reach the fixing portion.

On the other hand, since movement of a fluid is mainly caused by a descent or a fall into the vertical direction owing generally to its own weight, it can be considered that even the conventional technique mentioned above may show a prominent effect at the time of, for example, a stop or constant speed drive of a moving body. However, for example, when the variations of acceleration are significant, the case where some of the fluid scatters owing to inertia can be expected, and consequently a surer measure against the electrical connection caused by the fluid is desired.

SUMMARY

An aspect of the present invention is an insulative battery holding frame for holding a secondary battery cell including an electrolyte, the frame including a fixing portion for fixing the frame to a base member, and electrical connection preventing means for preventing any electrical connection between the base member and the fixing portion, the connection being caused by flow of a fluid having electrical conductivity.

BRIEF DESCRIPTION OF THE DRAWINGS

Exemplary embodiments of the present invention will be described in detail with reference to the following figures, wherein:

FIGS. 2A and 2B illustrate a battery holding frame according to an embodiment of the present invention and a conventional battery holding frame, respectively;

DESCRIPTION OF EMBODIMENTS

Figure 1:
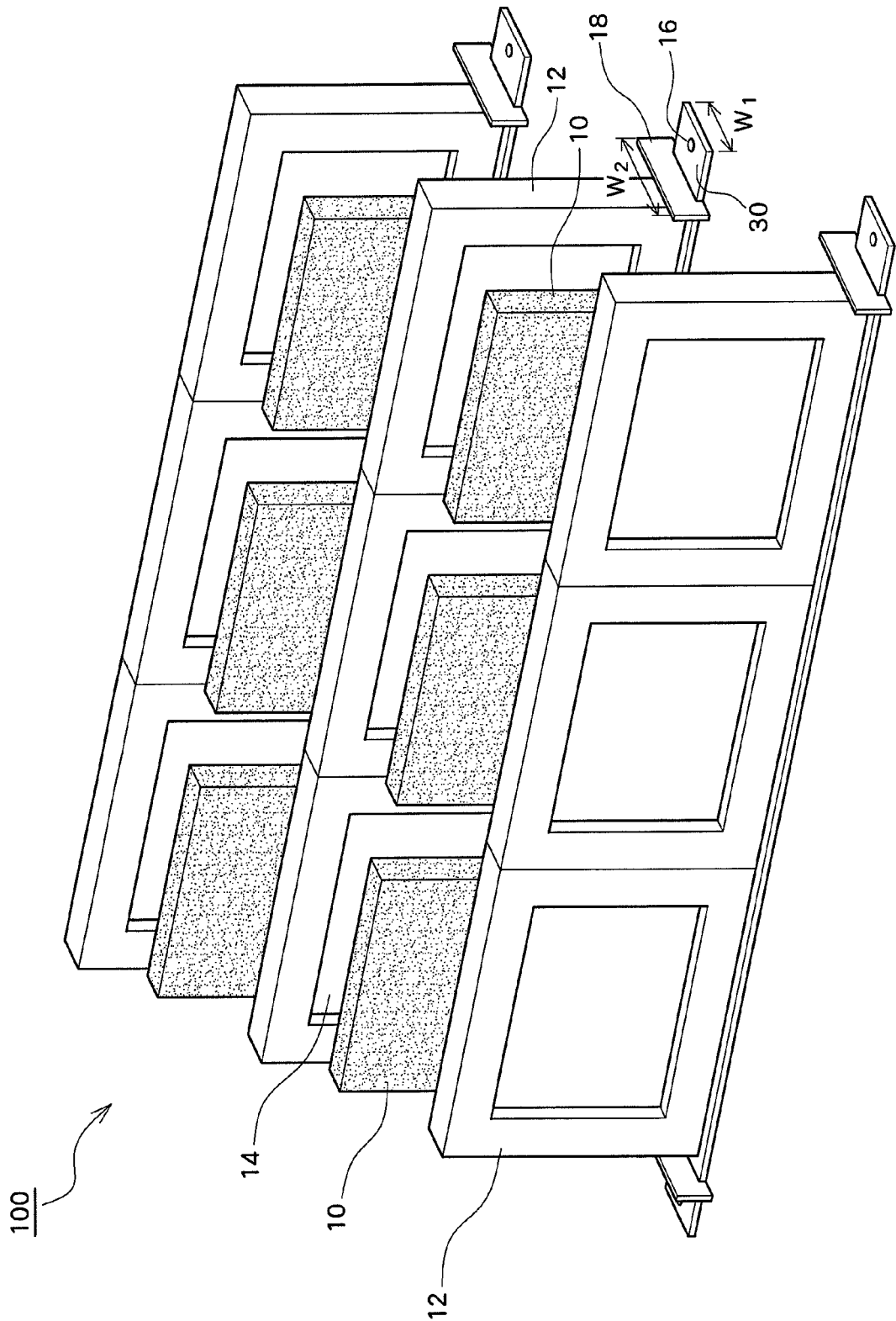
FIG. 1 is an exploded perspective view for illustrating the outline of the configuration of an assembled battery according to an embodiment of the present invention.

In the following, the preferred embodiments of the present invention will be described with reference to the attached drawings. Incidentally, the same configurations in the respective drawings will be denoted by the same reference numerals, and their repeated descriptions will be omitted.

FIG. 1 is an exploded perspective view for illustrating the outline of the configuration of an assembled battery according to an embodiment of the present invention. The assembled battery 100 illustrated in FIG. 1 includes battery cells 10 and insulative battery holding frames 12 putting the battery cells 10 between them to hold the battery cells 10 in a predetermined arrangement. The battery cells 10 arranged as the assembled battery 100 are electrically connected with not shown wiring so as to realize desired battery performances.

In the embodiment of the present invention, each of the battery holding frames 12 can be manufactured as follows: for example, a plurality of battery holding frame parts, each capable of holding one or more battery cells 10, is manufactured; not shown locking parts having well-known shapes, such as insertion portions and locking claws, are provided on the battery holding frame parts to connect the battery holding frame parts with one another, or not shown fastening members are provided on the battery holding frame parts to fasten the battery holding frame parts; and then a desired number of the battery holding frame parts are connected to one another. Moreover, as another embodiment, it is also possible to form the assembled battery 100 by integrally forming a series of battery holding frames 12 capable of holding a predetermined number and predetermined shapes of battery cells 10, and by combining the formed battery holding frames 12. The method of manufacturing the battery holding frames 12 is not limited to the ones described above, and it is possible to manufacture the battery holding frames 12 by any method.

Each of the battery holding frames 12 shown in FIG. 1 is equipped with battery holding portions 14 for holding the battery cells 10, and fixing portions 16 for fixing each of the battery holding frames 12 to a base member described below. Each of the battery holding portions 14 has a shape enabling the battery cells 10 to be reliably held in accordance with the shapes of the battery cells 10 to be held, solely by each of the battery holding frames 12, or by a combination of the battery holding portions 14 formed in adjacent battery holding frames 12. Each of the battery holding portions 14 also has a shape filling the role of a separator or a spacer for forming a gap having an appropriate thickness for insulation between neighboring battery cells 10 to prevent short circuiting of adjacent batteries.

In the embodiment of the present invention, it is an essential condition regarding the quality of the material of each of the battery holding frames 12 that they have excellent insulation. From the points of view of the ease of forming, being light in weight, and the like, thermoplastic resins, thermosetting resins, or the like are generally used as the material. For example, a polypropylene resin, a phenolic resin, and the like, are suitable.

Moreover, an electrical connection preventing portion 18 for preventing the electrical connection between each of the battery cells held in the battery holding frames 12 and each of the base members through a fluid having electrical conductivity is provided in the neighborhood of each of the fixing portions 16 shown in FIG. 1.

Figure 2A:
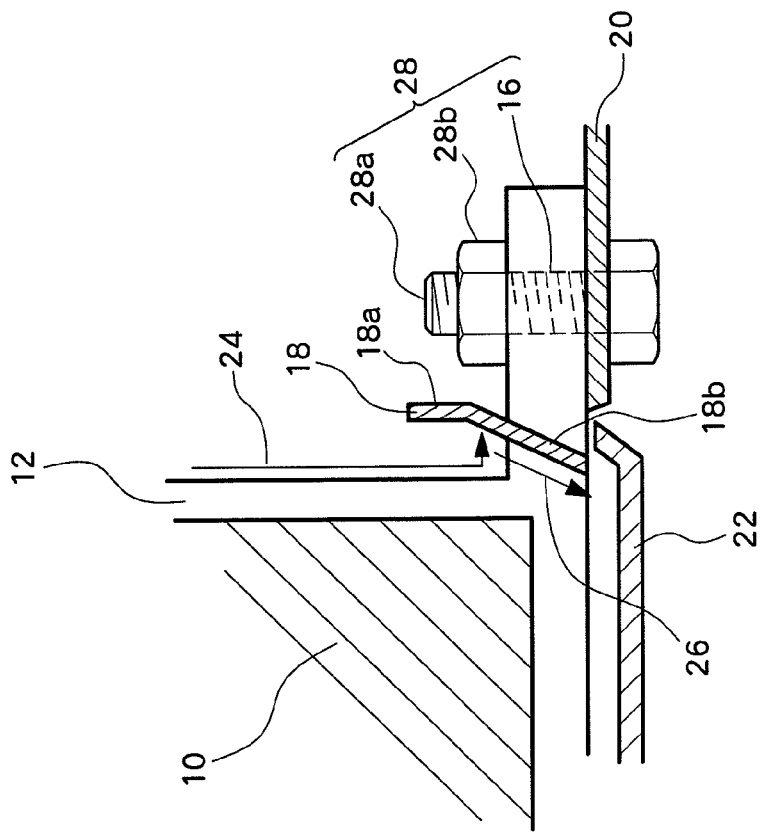
FIGS. 2A and 2B are views for comparing the states of flows of fluids to battery holding frames.
Figure 2B:
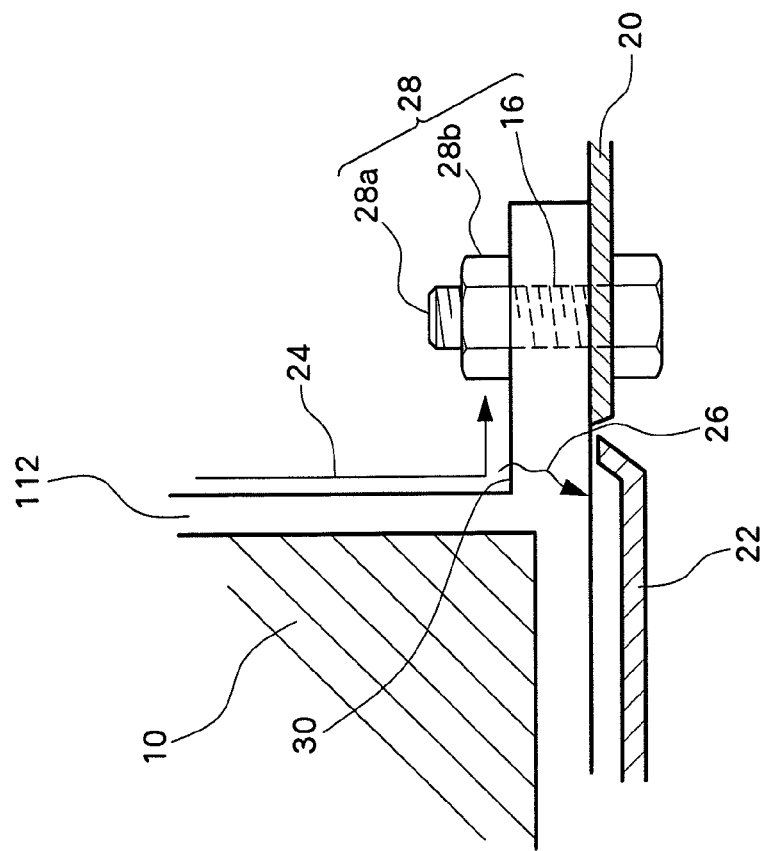

FIGS. 2A and 2B are views for comparing the states of the flows of the fluids having the electrical conductivity depending on the existence of each of the electrical connection preventing portions 18 shown in FIG. 1. The battery holding frame 12 shown in FIG. 2A corresponds to an enlarged view of one of the battery holding frames 12 shown in FIG. 1 including the vicinity of the fixing portion 16, and includes the electrical connection preventing portion 18 in the vicinity of the fixing portion 16. On the other hand, a conventional battery holding frame 112 illustrated in FIG. 2B has almost the same shape as that of the battery holding frame 12 of the embodiment of the present invention shown in FIG. 2A except for the fact that the electrical connection preventing portion 18 is not included.

The conventional battery holding frame 112 illustrated in FIG. 2B is fixed on a base member 20, such as a metal body or a battery box for housing the assembled battery 100, by inserting, for example, a metal bolt 28a into the fixing portion 16 formed in the bottom 30 of the battery holding frame 112 in advance, and by fastening the metal bolt 28a together with a corresponding nut 28b. The shape of the fixing portion 16 shown in FIG. 2B is an aperture corresponding to the shape of the insertion portion of the bolt 28a, but the shape is not limited to this. The shape can be changed according to the kind and shape of a fixing member used for the fixing of the battery holding frame 112 to the base member 20, and, for example, the fixing method of embedding at least a part of the battery holding frame 112 in the base member 20 can be adopted. In the following, a portion that includes the fixing portion 16 and is fixed to the base member 20 by the use of a fixing member (the bolt 28a and the nut 28b here) will be sometimes generically named as a fixing portion mechanism 28.

In FIG. 2B, a fluid including an electrolyte leaking out of the battery cell 10 and condensed water produced by the condensation of environmental moisture on the wall surface of the battery holding frame 112 or the like descends as shown by an arrow 24 due to gravity. After that, the fluid flows in an insulative tray 22 arranged under the battery cell 10 for the recovery of the electrically conductive fluid as shown by an arrow 26, but some of the fluid enters into the side of the fixing portion 16. The condensed water and/or electrolyte entering into the side of the fixing portion 16 flow into the side of the base member 20 through the nut 28b and the bolt 28a, and the condensed water and/or the electrolyte may have been a factor of electrical connection.

On the other hand, as shown in FIG. 2A, the provision of the electrical connection preventing portion 18 on the battery holding frame 12 enables the prevention of the entrance of the fluid into the side of the fixing portion 16 and the prevention of any electrical connection. The electrical connection preventing portion 18 shown in FIG. 2A is formed as a string of members including an entrance preventing portion 18a for preventing the entrance of the fluid into the side of the fixing portion 16 and a guiding portion 18b for guiding the fluid into the insulative tray 22.

The electrical connection preventing portion 18 has a shape extending into the front side and the back side (width $w_2$) to the width ($w_i$) of the thickness direction (stacking direction) of the bottom 30 of each of the battery holding frames 12 shown in FIG. 1 (see FIG. 1) to be configured so as to be able to prevent the fluid from going around the ends of the electrical connection preventing portion 18 to enter into the side of the fixing portion 16. In this case, it is also suitable to tilt at least a part of the guiding portion 18b of the electrical connection preventing portion 18 from a vertical line as illustrated in FIG. 2A in order to prevent or suppress the scattering of the fluid from the electrical connection preventing portion 18 in, for example, the direction of the fixing mechanism 28 to guide the fluid into the insulative tray 22 more reliably. Incidentally, it is also possible to adopt the configuration of guiding the fluid into an insulation region, such as a pipe, the insulation region being made of an insulative member, to discharge the fluid to the outside after that, in place of the insulative tray 22 in the present embodiment.

The electrical connection preventing portion 18 shown in FIG. 2A can be formed as a string of members including both the entrance preventing function and the guiding function, for example, in a body together with the other parts of the battery holding frame 12 or in a separated body. It is also possible to combine members or configurations having individual functions with one another as another embodiment.

Figure 3:
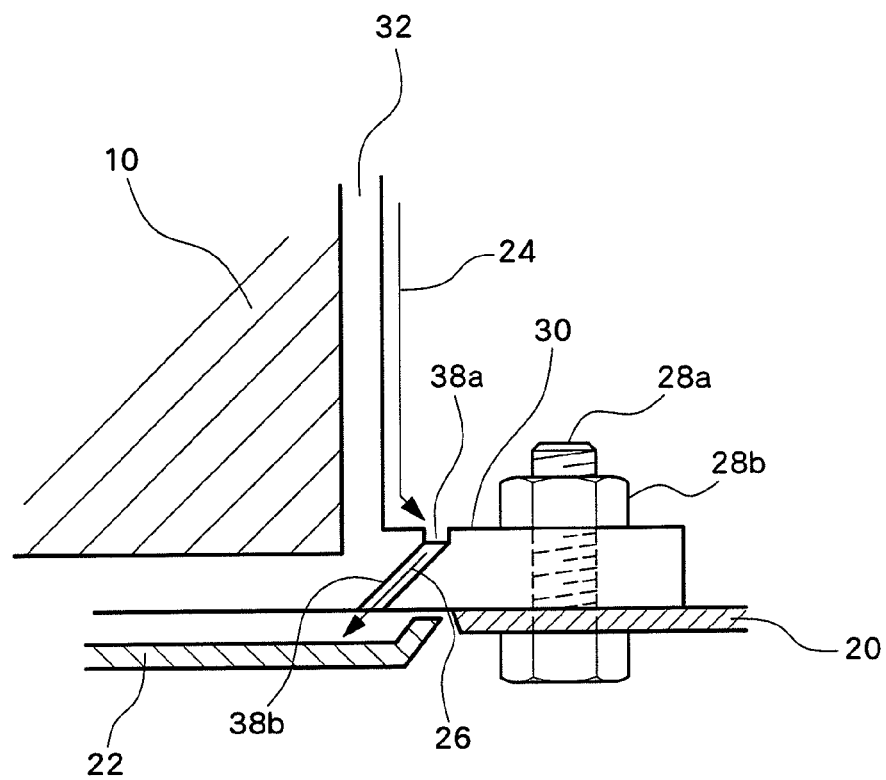
FIG. 3 is an enlarged view of the principal part for illustrating the outline of the configuration of a battery holding frame according to another embodiment of the present invention.

FIG. 3 is an enlarged view of the principal part for illustrating the outline of the configuration of a battery holding frame according to another embodiment of the present invention. The enlarged part of the battery holding frame shown in FIG. 3 corresponds to that in FIG. 2A. The battery holding frame 32 shown in FIG. 3 is provided with a surface flow path groove 38a on the surface side of the bottom 30 as the entrance preventing portion and a side surface flow path groove 38b on the side surface side of the bottom 30 as a guiding portion. In FIG. 3, a fluid descending on the wall surface of the battery holding frame 32 as shown by the arrow 24 falls into the surface flow path groove 38a and consequently the entrance of the fluid into the side of the fixing portion 28 is blocked. The fluid flowing into the surface flow path groove 38a is guided into the insulative tray 22 via the side surface flow path groove 38b.

In FIG. 3, it is also suitable to suitably adjust the depth and width of the surface flow path groove 38a in order to prevent the inflow of the fluid descending on the wall surface of the battery holding frame 32 into the side of the fixing portion 16 more reliably, but it is also suitable to further provide a scatter preventing wall (not shown) corresponding to the entrance preventing portion 18a of FIG. 2A between the surface flow path groove 38a and the fixing portion 16 as another embodiment. In this case, the surface flow path groove 38a may be one spanning the whole thickness direction of the bottom 30 shown in FIG. 1 as described above, or may be one spanning only in both end portions, that is, only in the vicinity of the boundary portions between the bottom 30 and the side surface flow path groove 38b. According to the present embodiment, it becomes possible to prevent the scattering and inflow of the fluid into the side of the fixing portion 16 more reliably even if the amount of the flowing fluid increases.

Figure 4:
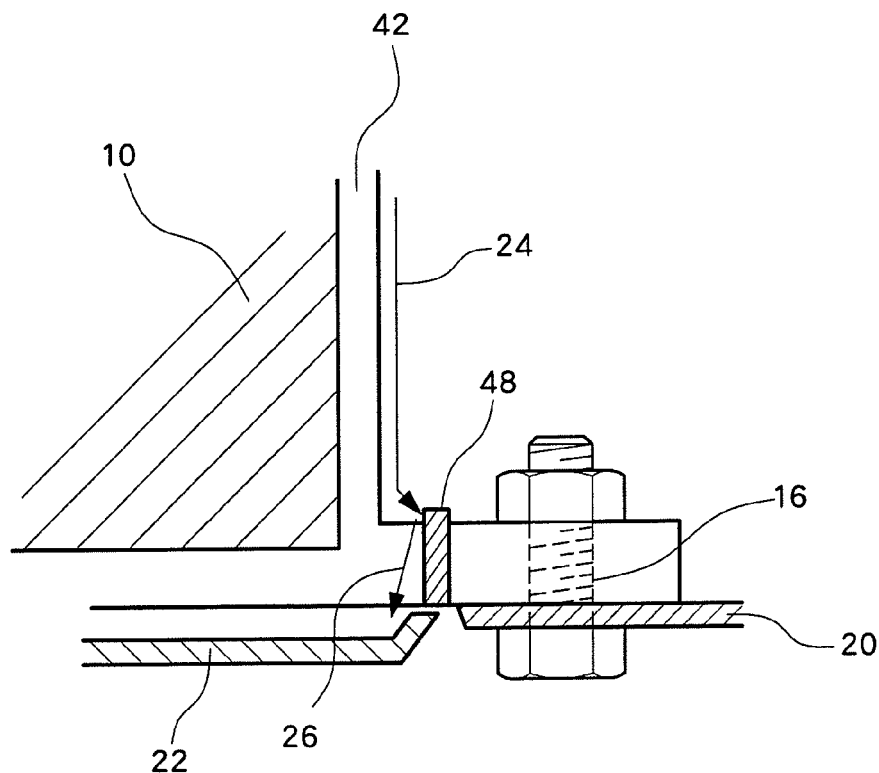
FIG. 4 is an enlarged view of the principal part for illustrating the outline of the configuration of a battery holding frame according to another embodiment of the present invention.

FIG. 4 is an enlarged view of the principal part for illustrating the outline of the configuration of the battery holding frame according to another embodiment of the present invention. The enlarged part of the battery holding frame shown in FIG. 4 corresponds to the ones shown in FIGS. 2A and 3. The battery holding frame 42 shown in FIG. 4 has a configuration similar to that of the battery holding frame 12 shown in FIG. 2A except for the provision of an electrical connection preventing member 48 in place of the electrical connection preventing portion 18. The electrical connection preventing member 48 is a member that has a good cutoff performance and is made of, for example, a rubber sponge, a silicone rubber, or a urethane series resin. The electrical connection preventing member 48 is adhered to be fixed to the battery holding frame 42 having the conventional shape with adhesion or other well-known methods, and as a result the electrical connection preventing member 48 can demonstrate a similar effect to that of the electrical connection preventing portion 18 shown in FIG. 2A. In this case, one member may be used as the electrical connection preventing member 48, or members formed as a plurality of members, such as an entrance preventing member corresponding to the entrance preventing portion 18a and a guiding member corresponding to the guiding portion 18b shown in FIG. 2A, may be combined with each other to be used as the electrical connection preventing member 48.

Figure 5:
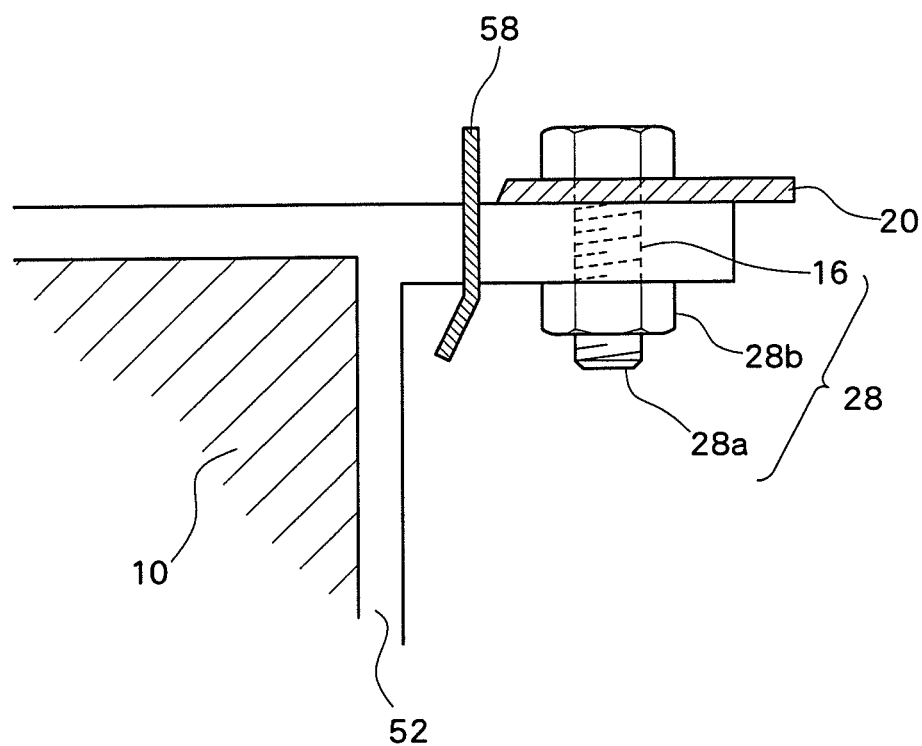
FIG. 5 is an enlarged view of the principal part for illustrating the outline of the configuration of a battery holding frame according to the other embodiment of the present invention.

FIG. 5 is an enlarged view of the principal part for describing the outline of the configuration of a battery holding frame according to another embodiment of the present invention. The enlarged part of the battery holding frame shown in FIG. 5 corresponds to those of FIGS. 2A, 3, and 4. The battery holding frames 12, 32, and 42 shown in FIGS. 2A, 3, and 4, respectively, are fixed on the upper side of the base member 20, but the battery holding frame 52 shown in FIG. 5 is different from the battery holding frames 12, 32, and 42 in that the battery holding frame 52 is fixed on the lower side of the base member 20. An electrical connection preventing portion 58 of the battery holding frame 52 shown in FIG. 5 is not only able to prevent the fluid originated in the battery cell 10 and the vicinity thereof from entering onto the side of the fixing portion 16, but is also able to prevent a fluid, such as condensed water, from flowing onto the side of the battery cell 10 even when the fluid enters from the outside into the fixing mechanism 28.

The present embodiment can be configured so that the fluid originating in the battery cell 10 and the vicinity thereof may flow into an insulative tray, which is not shown here and is arranged under the battery cell 10. Moreover, as another embodiment, it is also possible to adopt a configuration in which the fluid is discharged to the outside after being made to flow through an insulation region, such as a pipe, which is configured of, for example, an insulative member. On the other hand, the present embodiment can be also configured so that the fluid that has entered from the outside into the fixing mechanism 28 may be discharged to the outside through the insulation region. Moreover, as another embodiment, the fluid may be made to join a not shown insulative tray under the battery cell 10.

The electrical connection preventing portion 58 shown in FIG. 5 can be formed as, for example, one body or separated bodies against the other parts of the battery holding frame 52. As another embodiment, members or configurations that have the respective individual functions can be combined with one another to be used as the electrical connection preventing portion 58. As further embodiment, it is suitable to prevent any electrical connection between the fixing portion 16 or fixing mechanism 28 and the battery cell 10 caused by a flow of the fluid by providing other electrical connection preventing means (not shown) corresponding to, for example, the surface flow path groove 38a and/or side surface flow path groove 38b shown in FIG. 3, or the electrical connection preventing member 48 shown in FIG. 4 in place of the electrical connection preventing portion 58 shown in FIG. 5, or in combination with the electrical connection preventing portion 58.

As described above, according to the embodiments of the present invention, a fluid having electrical conductivity is positively prevented from the entering into a fixing portion for fixing the battery holding frame to a base member, and consequently it becomes possible to suitably prevent or suppress the electrical connection between the assembled battery and the base member.

The present invention can be suitably used in an insulative battery holding frame for holding a secondary battery cell including an electrolyte to configure an assembled battery.

The invention claimed is:

1. An insulative battery holding frame for holding a secondary battery cell including an electrolyte, the frame comprising:
    a frame portion having inside thereof a battery holding portion for holding the secondary battery, the frame portion comprising a lower frame portion and side frame portions;
    a projection portion formed by a bottom portion of the lower frame portion that projects toward a lateral direction from an outer wall of each of the side frame portions of the frame portion;
    a fixing portion provided on the projection portion, for fixing the frame to a base member; and
    an electrical connection preventing plate for preventing any electrical connection between the base member and the secondary battery cell, the connection being caused by flow of a fluid having electrical conductivity,
    wherein the electrical connection preventing plate comprises:
    an entrance preventing portion disposed between a side wall of the holding frame and the fixing portion so as to project from an upper surface of the projecting portion, for preventing the fluid having the electrical conductivity from entering into the fixing portion; and
    a guiding portion projecting from a side surface of the projecting portion for guiding the fluid into an insulation region arranged in a lower side portion of the secondary battery cell.

2. The battery holding frame according to claim 1, wherein the entrance preventing portion and the guiding portion are continuously formed.

3. An insulative battery holding frame for holding a secondary battery cell including an electrolyte, the frame comprising;
- a frame portion having inside thereof a battery holding portion for holding the secondary battery, the frame portion comprising a lower frame portion and side frame portions;
- a projection portion formed by a bottom portion of the lower frame portion that projects toward a side direction from an outer all of each of side frame portions of the frame portion;
- a fixing portion provided on the projection portion, for fixing the frame to a base member; and
- an electrical connection preventing groove for preventing any electrical connection between the base member and the secondary battery the connection being caused by flow of a fluid having electrical conductivity,
- wherein the electrical connection preventing groove comprises:
- an entrance preventing portion disposed on an upper surface of the projection portion between a side wall of the holding frame and the fixing portion, for preventing the fluid having the electrical conductivity from entering into the fixing portion; and
- a guide portion formed as a groove on a side surface of the projection portion for guiding the fluid into an insulation region arranged in a lower side portion of the secondary battery cell.

4. The battery holding frame according to claim 2, wherein the guiding portion includes a flow path groove for guiding the fluid into the insulation region arranged in the lower side portion of the secondary battery cell.

5. The battery holding frame according to claim 1, wherein the fluid having the electrical conductivity is selected from a group consisting of condensed water and the electrolyte.

6. The battery holding frame according to claim 2, wherein the fluid having the electrical conductivity is selected from a group consisting of condensed water and the electrolyte.

7. The battery holding frame according to claim 3, wherein the fluid having the electrical conductivity is selected from a group consisting of condensed water and the electrolyte.

8. The battery holding frame according to claim 4, wherein the fluid having the electrical conductivity is selected from a group consisting of condensed water and the electrolyte.

9. An assembled battery, comprising:
the battery holding frame according to claim 1; and
a plurality of secondary batteries held in the battery holding frame.

10. The battery holding frame according to claim 1, wherein
the electrical connection preventing plate prevents electrical connection being caused by flow of the fluid having electrical conductivity from the frame to the base member via the fixing portion.

11. The battery holding frame according to claim 1, wherein
the electrical connection preventing plate prevents electrical connection being caused by flow of the fluid having electrical conductivity from the base member to the frame via the fixing portion.

\* \* \* \* \*